United States Patent [19]

Moore

[11] Patent Number: 4,737,719
[45] Date of Patent: Apr. 12, 1988

[54] COHERENT DETECTION SYSTEM FOR USE IN INDUCTION WELL LOGGING APPARATUS

[75] Inventor: Robert A. Moore, Houston, Tex.

[73] Assignee: Halliburton Company, Duncan, Okla.

[21] Appl. No.: 865,319

[22] Filed: May 21, 1986

[51] Int. Cl.$^4$ .............................................. G01V 3/28
[52] U.S. Cl. .................................. 324/339; 324/79 R
[58] Field of Search ............... 324/328, 329, 332, 333, 324/334, 338, 339, 340, 341–343, 79 R, 82, 83 Q, 83 R, 303; 331/14, 18, 25, 30, 31

[56] References Cited

U.S. PATENT DOCUMENTS

| | | | |
|---|---|---|---|
| 3,150,314 | 9/1984 | Tanguy | 324/339 |
| 3,179,879 | 4/1965 | Tanguy | 324/339 |
| 3,496,455 | 2/1970 | Gouilloud | 324/339 |
| 3,706,025 | 12/1972 | Regat | 324/339 |
| 3,978,403 | 8/1976 | Mansfield et al. | 324/79 R X |
| 4,069,462 | 1/1978 | Dunn | 331/14 X |
| 4,070,612 | 1/1978 | McNeill et al. | 324/334 |
| 4,086,544 | 4/1978 | Fried | 331/18 X |
| 4,302,722 | 11/1981 | Gianzero | 324/339 |
| 4,604,581 | 8/1986 | Thadani et al. | 324/339 |
| 4,611,173 | 9/1986 | Bravenec et al. | 324/339 |

Primary Examiner—Reinhard J. Eisenzopf
Assistant Examiner—Warren S. Edmonds
Attorney, Agent, or Firm—William J. Beard

[57] ABSTRACT

In an induction logging system supported on a sonde, an improved received signal processing system is disclosed. The sonde supports transmitting and receiving coils. The transmitter sends pulses at a frequency $F_1$, normally 20 kilohertz. The receiver includes a frequency multiplier circuit driven with a frequency $F_2$. The multiplier forms an output to a phase sensitive detector driven by a gating signal $F_3$ where $F_3 = F_1 - F_2$. This reduces error arising in the receiver.

9 Claims, 1 Drawing Sheet

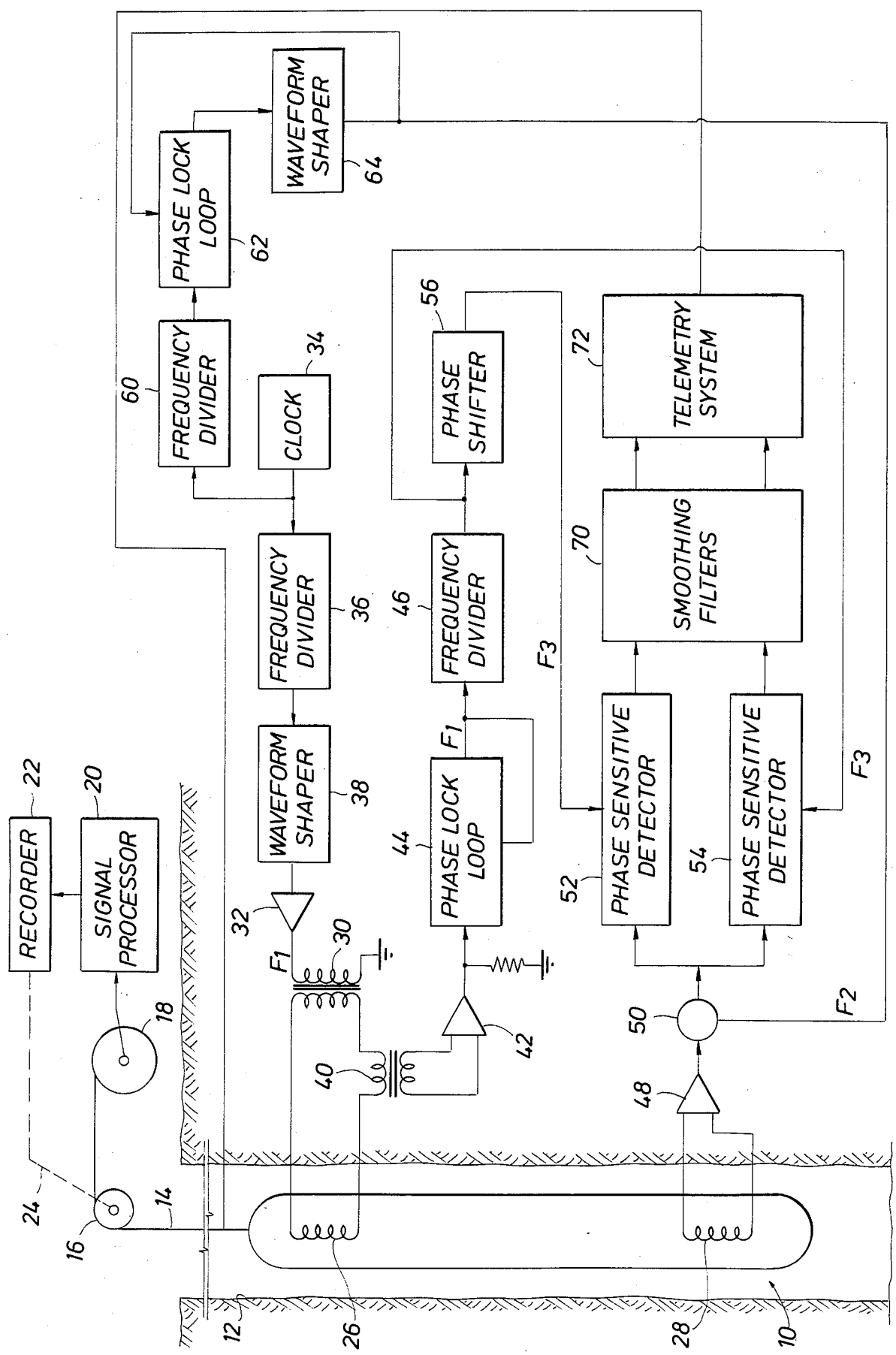

COHERENT DETECTION SYSTEM FOR USE IN INDUCTION WELL LOGGING APPARATUS

BACKGROUND OF THE DISCLOSURE

This disclosure is directed to apparatus for use in induction well logging apparatus. An induction well logging system utilizes a sonde which supports a transmitter coil (one or more) to generate a magnetic field in the formations adjacent to the well borehole. The sonde further supports one or more receiver coils which pick up formation coupled induced signals which are subsequently processed. These induced signals contain data regarding the nature of the adjacent formations. In the usual course, a receiver signal is amplified, supplied to a phase sensitive detector and then filtered. The filtered signal is provided through telemetry to the surface. In the normal operation of an induction logging system, the phase sensitive detector (PSD) is operated at about a 20 kilohertz rate. This detection system converts the received signal to an in-phase signal component and also a quadrature phase component. Changes in phase shift either in the high-gain amplifier, phase sensitive detector, or gating circuits which sequence the detector results in inaccurate data. Some changes can arise as a result of electronic component drift or degradation as the system is exposed to elevated temperature downhole. Specifically, the error mechanism may be changes in transistor switching times in the phase sensitive detector switches or delays in the onset of the leading edge of each half cycle in the gating signal. For these and several other reasons, the quality of the measurement is degraded. This reduces the accuracy of the measurements which are obtained from the induction logging system, especially when small in-phase signals are being measured in the presence of relatively large quadrature signals.

SUMMARY OF THE INVENTION

The apparatus of this disclosure sets forth a heterodyne system which controls the switching of the phase sensitive detector (PSD). This reduces irregularity in the PSD switching; such irregularity causes changes in the measured in-phase component, and may degrade the quadrature signal rejection due to switching delay times. With the foregoing in view, the apparatus of the present invention is summarized as a heterodyning circuit incorporated in an induction logging system utilizing the stability of phase lock loop circuits to thereby accurately control the gating of the phase sensitive detectors connected to the receiving coil signal processing circuitry. Moreover, the circuitry of the invention can be incorporated in an induction logging system having multiple receiving coils or arrays (sets of coils). The heterodyne feature yields improved high temperature stability in operation of the PSD in the receiving coil circuitry. Additionally, the choice of difference frequency between the received signal and the local oscillator frequency can be chosen so that advantageous properties result therein.

DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

The single FIGURE shows an induction well logging sonde in a well borehole. The system incorporates the circuitry of the present invention yielding coherent detection free of drift and otherwise temperature stabilized.

DETAILED DESCRIPTION OF THE PREFERRED EMBODIMENT

In the drawing, the numeral 10 identifies a downhole sonde which is supported in a well borehole 12 on an armored logging cable 14. The depth of the sonde is determined by the extended length of the cable. Typically, the sonde can be lowered to the full depth of the well 12 and retrieved. During this operation, data is collected, processed and recorded. Moreover, the logging cable 12 passes over a sheave 16 at the surface and is then spooled on a drum 18. The armored logging cable incorporates conductors which connect with the circuitry in the sonde 10. At the surface, they are connected with a signal processor 20 which may be a general purpose Digital computer such as a PDP-11 made by Digital Equipment Corporation of Cambridge, Mass. or the like. The various conductors in the cable 14 deliver suitable signals to be recorded by a recorder 22. The data for the recorder 22 are recorded as a function of borehole depth of the sonde. In the normal circumstance, the depth is determined by an electrical or mechanical means 24 which measures the position of the sonde 10 in the well 12 and provides a signal indicative of that depth to the recorder 22. In operation, the sonde 10 is lowered to the bottom of the well. The induction logging equipment is energized while the sonde is retrieved. Signals transferred over the logging cable 14 are ultimately connected to the recorder 22. The signals are recorded as a function of depth.

Going now to the sonde 10, the numeral 26 identifies a transmitter coil in the sonde. The transmitter coil 26 forms an output signal which is coupled into the formation adjacent to the well 12. A received signal generated by currents induced in the formation is sensed in a receiver coil 28. The transmitter coil 26 is connected to a transmitter driving signal for the transmitter coil 26. The frequency of the transmitter signal is typically fixed at 20 kilohertz. While other frequencies may be selected, 20 kilohertz is preferred in most well logging applications.

The amplifier 32 is driven by a signal originating with a clock 34. The clock 34 forms an accurate pulse train which is output to a frequency divider circuit 36. The frequency divider 36 converts the clock signal into a procession of pulses having the required 20 KHZ pulse rate. That frequency will also be identified as $F_1$. This particular frequency signal is then input to a wave form shaper 38 which changes the shape of the pulses from a procession of square pulses into a sinusoidal shaped wave form so that the transmitter coil 26 is provided with the proper shape of signals. To describe the operation of the transmitting system, a current flow is formed in the transmitter coil 26. This current flow passes through the primary of a transformer 40. This transformer forms an input to a current sensing circuit. A small amplitude output signal is coupled to an amplifier 42. The amplifier 42 is then input to a phase lock loop (PLL) circuit 44. The PLL circuit 44 is driven at a frequency dependent on the clock 34. Thus, the PLL circuit forms an output signal which is synchronized with the transmitter. This signal is provided to a frequency divider circuit 46. The frequency divider 46 forms an output signal which has a frequency described as $F_2$. The relationship of $F_2$ to $F_1$ will be described in more detail hereinafter. The output from the frequency divider circuit 46 is then input for subsequent use in the receiving circuitry as will be described. Perhaps defining the relationship of $F_1$ and $F_2$ will clarify further discussion. Since $F_1$ is the transmitter frequency and the divider 46 forms $F_2$, they are best related by $$F_2 \div F_1 = (2K-1)/(2K+1)$$

where K is an integer.

Attention is now directed to the receiving circuitry. The receiver coil 28 forms an output signal which is provided to an amplifier 48. It will be appreciated by those skilled in the art that while the coil 28 is shown on a single coil that actually this could be a coil array and will normally include a bucking or cancellation coil for balancing out any signal component due to mutual inductance with coil 26. The amplifier 48 forms an output for an analog multiplier circuit 50. The multiplier 50 forms an output signal which is provided to similar phase sensitive detector (PSD) circuits 52 and 54. The circuits 52 and 54 are operated in like fashion. Both are driven by signals at a frequency $F_3$. The two circuits are driven out of phase with one another by 90°. This 90° phase shift is obtained by a phase shifter 56. The phase shifter 56 is provided with the output of the frequency divider circuit 46. In summary, the two gating signals which are input to the PSD circuits are at a common frequency and are phase shifted by 90° relative to one another. The relation of $F_3$ to $F_1$ and $F_2$ is given below. Certain advantages arising from this relationship will be developed also.

The system further includes an additional frequency divider 60 driven by the clock 34. The divider 60 forms output pulses at a specified frequency provided to a phase lock loop circuit 62. In turn, the PLL circuit 62 forms an output signal for a wave form shaping circuit 64. The PLL 62 forms an output signal at the specified frequency $F_2$. This shaped signal $F_2$ is input to the multiplier 50. The $F_2$ signal for the multiplier is shaped to a suitable (low distortion) sinusoidal wave form.

Understanding of operation of this device is assisted by defining the various signals in the system. First of all, the output of the amplifier 32 is at $F_1$. This is under control of the clock 34. The same frequency $F_1$ is observed at the output of the PLL 44. The frequency divider 60 in conjunction with the PLL 62 provides an additional signal at a frequency $F_2$. This is imposed on the analog multiplier 50. Last of all, the signal at frequency $F_3$ is input to the PSD 52 and the PSD 54, the two being driven by the same frequency having a 90° phase shift.

Since the transmitter current is a sinusoidal wave form at frequency $F_1$, the received signal is also at frequency $F_1$. The received signal $F_1$ is input to the analog multiplier 50 and has $F_2$ mixed with it. The output of the multiplier 50 is thus a mix of signals including $F_1$, $F_2$, and the sum and difference of $F_1$ and $F_2$. Define frequency $F_3$ as equal to the difference of frequency $F_1$ minus frequency $F_2$. Moreover, $F_3$ is substantially less than $F_1$. By suitable derivation it can also be shown that:

$$F_1 - F_2 = F_3 = (2/2K+1)F_1.$$

In the foregoing, K is an integer. For various values of K, the table below sets forth a relationship of the various frequencies, $F_1$, $F_2$, $F_3$ for $F_1 = 20.0$ KHZ.

| K  | $F_1$     | $F_2$      | $F_3$      |
|----|-----------|------------|------------|
| 1  | 20.0 KHZ  | 6.67 KHZ   | 13.3 KHZ   |
| 2  | 20.0 KHZ  | 12.0 KHZ   | 8.0 KHZ    |
| 3  | 20.0 KHZ  | 14.23 KHZ  | 5.714 KHZ  |
| 7  | 20.0 KHZ  | 17.33 KHZ  | 2.67 KHZ   |
| 12 | 20.0 KHZ  | 18.4 KHZ   | 1.6 KHZ    |
| 13 | 20.0 KHZ  | 18.5 KHZ   | 1.5 KHZ    |

The difference frequency, $F_3$, is thus defined by the frequency divider 46 in the connected circuitry to thereby gate the PSD 52. In like fashion, the PSD 54 is also gated, the two being provided with the received signal after mixing. The two circuits provide in-phase and quadrature signal components. These are output to smoothing filters 70 and then output to the telemetry system 72 for transmission to the surface.

Detection is improved by selecting $F_3$ much smaller than $F_1$. The switching interval of the PSD circuit components is a much smaller percentage of the relatively long period of $F_3$ compared to the period of the $F_1$ signal. If a higher frequency $F_3$ were used, the period would be reduced and the relative percent size of the switching period increased. In the situation where a high frequency $F_3$ is used, measurements are susceptible to changes from PSD gating delays or changes in switching interval. Such changes arise routinely with increasing well temperature.

As will be understood, the transmitter current at 20 kilohertz is at a precisely controlled frequency $F_1$. Thus, the received signal is at the frequency $F_1$ also. The analog multiplier 50 is provided with the local oscillator signal to be mixed with the received signal. Output of the multiplier contains signal at frequencies $F_1 + F_2$, $F_1$, $F_2$ and $F_1 - F_2$. The difference $F_1 - F_2$ is significant because detection at the PSD 52 is gated by the difference signal or $F_3$. This lower frequency gating controls the timing of operation of the two PSD detectors 52 and 54. This lower frequency gating thereby overcomes drift and unstable performance of detector circuitry, or drift arising from other sources.

By defining $F_1$ and $F_2$ given above, the system has advantages relating to harmonics. The multiplier output includes the sum $F_1$ and $F_2$. Rewriting with the definitions of $F_1$, $F_2$ and $F_3$, one obtains:

$$F_1 + F_2 = \frac{2K+1}{2K+1} + \frac{2K-1}{2K+1} = \frac{4K}{2K+1}$$

$$\text{But } F_3 = \frac{2F_1}{2K+1}$$

$$\text{Or, } F_1 + F_2 = 2KF_3$$

Since K is an integer, then $2KF_3$ is an even harmonic of $F_3$. The PSD circuitry rejects even harmonics intrinsically. For these reasons, the dependent relationship of $F_1$, $F_2$, $F_3$ given above is valuable to suppress harmonics.

Another valuable benefit relates to the third harmonic of $F_1$. In PSD systems known heretofore, the third harmonic component amplitude is sizable, causing a DC shift in the output. In this system, the third harmonic of $F_3$ does not form a DC output.

In similar fashion, consider any odd harmonic of $F_1$ where N is an odd integer. Then $F_1 - F_2$ becomes $$\frac{[2K(N-1) + N + 1]F_1}{2K + 1}$$

Examining terms in the numerator, one finds $2K(N-1)$ and $N+1$ which are both even numbers. By designating K as an even number, the PSD will reject all odd order harmonics of $F_1$ because they do not give rise to odd order harmonics of $F_3$.

For these reasons, the received signal is made insensitive to drift or error in operation, or change of circuit component value as a result of exposure to high temperatures. It is very important to note that the phase lock loop circuits fix frequencies at a precise value, thereby yielding high quality performance in the circuit. Moreover, this enables data to be obtained which is free of error and very reliable.

As will be understood, the circuitry in the sonde can be duplicated for each receiving coil or array. If it is necessary to incorporate multiple receiving coils or arrays cooperative with a single transmitter, the phase lock loop circuit 44 can form gating signals at $F_3$ for all of the receiver coils in such a system.

While the foregoing is directed to a preferred embodiment of the invention, the scope of the invention is determined by the claims which follow.

I claim:

1. An induction well logging system having a coherent detection system and a fluid tight sonde having transmitter and receiver coils, comprising:
    (a) means for generating a transmitter signal at a specified frequency $F_1$ wherein said transmitter coil is provided with a transmitter signal at $F_1$;
    (b) receiving means longitudinally spaced in said sonde from said transmitter coil and connected to a receiver coil for receiving an induced signal from the earth formation in the vicinity of a well borehole, said receiving means forming output signals providing well logging information in phase and in phase quadrature with said transmitter, and wherein said receiving means incorporates phase sensitive detector means for processing received signals into in-phase and phase quadrature components;
    (c) means for forming gating signals for said phase sensitive detector means having a frequency $F_3$ functionally related to $F_1$ and including
        (1) clock means for forming a mixed frequency signal and means responsive to said fixed frequency signal for forming $F_1$; and
        (2) means having $F_1$ as an input to form a signal at a frequency $F_2$, dependent on $F_1$ and means for heterodyning the received signal at said receiving means, said heterodyning means having two inputs being respectively $F_2$ and received signals at the receiver incorporating an $F_1$ frequency component.

2. The apparatus of claim 1 wherein $F_2$ is formed by circuit means including a phase lock loop.

3. The apparatus of claim 1 wherein means for forming $F_3$ has an input from the transmitter coil provided to a phase lock loop circuit to form $F_3$ derivative from $F_1$.

4. The apparatus of claim 1 wherein said receiving means includes duplicate phase sensitive detector means each provided with an input gate signal and wherein a signal is provided to both of said detector means at a frequency $F_3$.

5. The apparatus of claim 4 wherein said gating signals differ by 90°.

6. The apparatus of claim 1 including current sensing means connected with the transmitter coil to form an output signal then input to phase lock loop circuit means to form $F_1$.

7. The apparatus of claim 1 wherein $F_1 - F_2 = F_3$ where $F_3 \neq F_1$ and $F_3 \neq F_2$.

8. The apparatus of claim 7 wherein there are two phase sensitive detector means connected to said receiver means, and further including phase shifter means for shifting $F_3$ gating signal applied to one relative to the other of said phase sensitive detector means.

9. The apparatus of claim 8 wherein the phase shift is 90°.

* * * * *